May 26, 1936.	R. E. W. HARRISON ET AL	2,042,257
MACHINE TOOL
Filed June 30, 1931	5 Sheets-Sheet 1
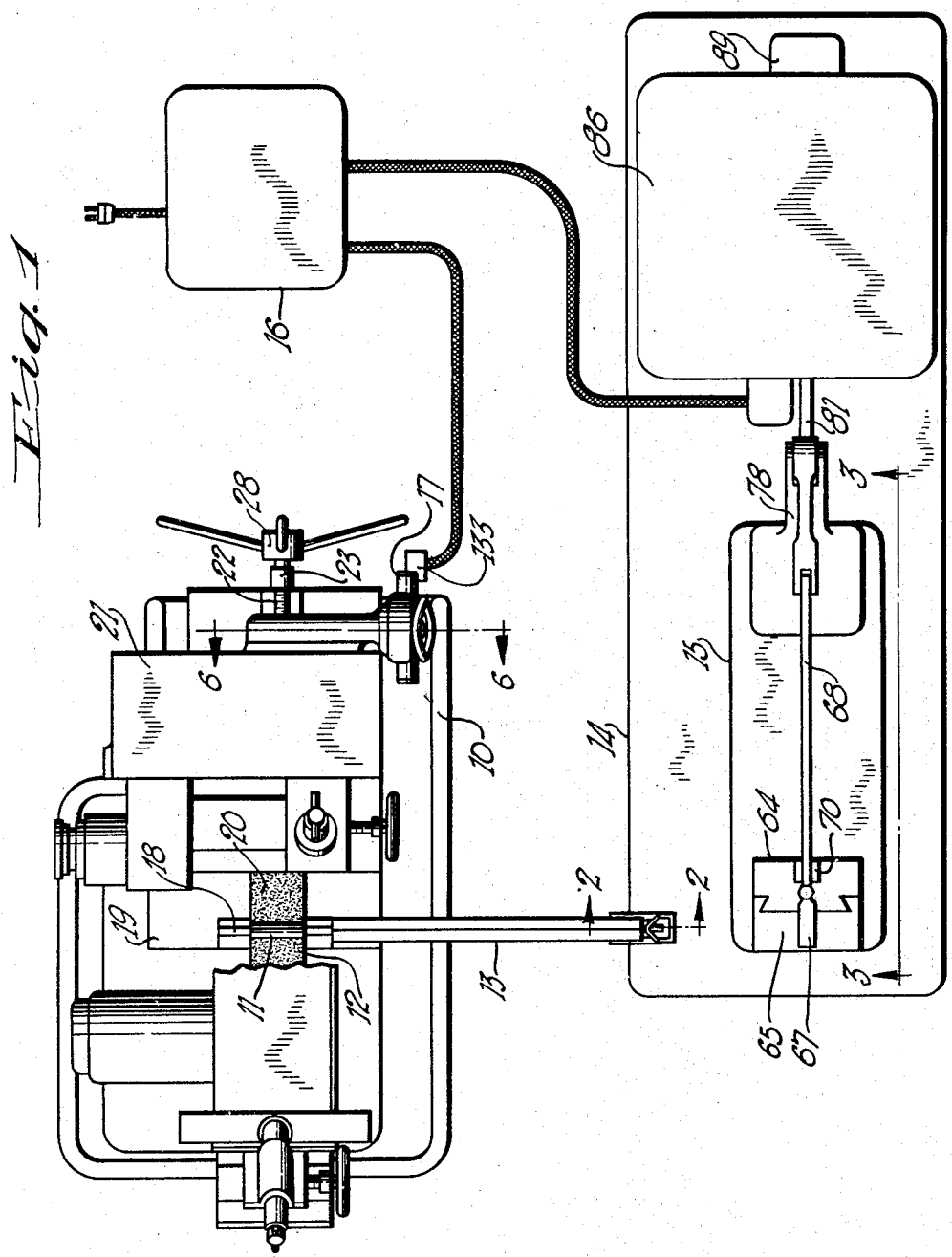
Inventor
ROBERT E. W. HARRISON
CECIL W. HOPKINS
By　A. K. Parsons
Attorney

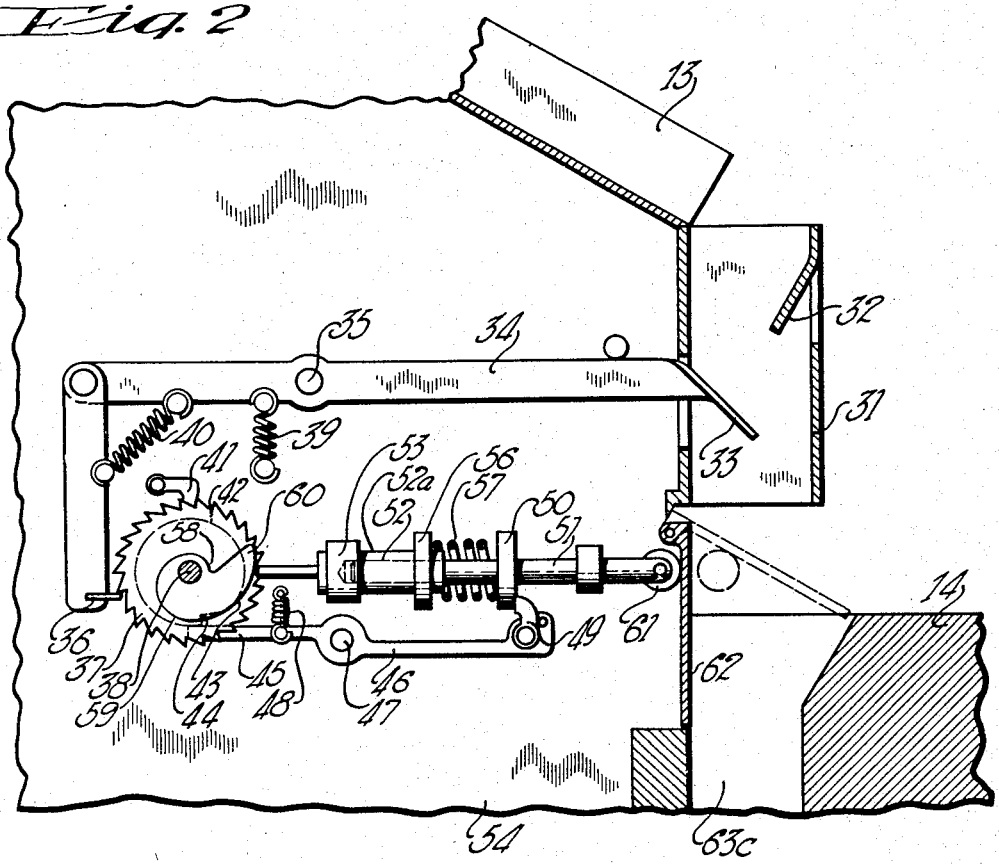

May 26, 1936. R. E. W. HARRISON ET AL 2,042,257
MACHINE TOOL
Filed June 30, 1931   5 Sheets-Sheet 3

Inventor
ROBERT E. W. HARRISON
CECIL W. HOPKINS
By H. K. Parsons
Attorney

Inventor
ROBERT E.W. HARRISON
CECIL W. HOPKINS
By A.K. Parsons
Attorney

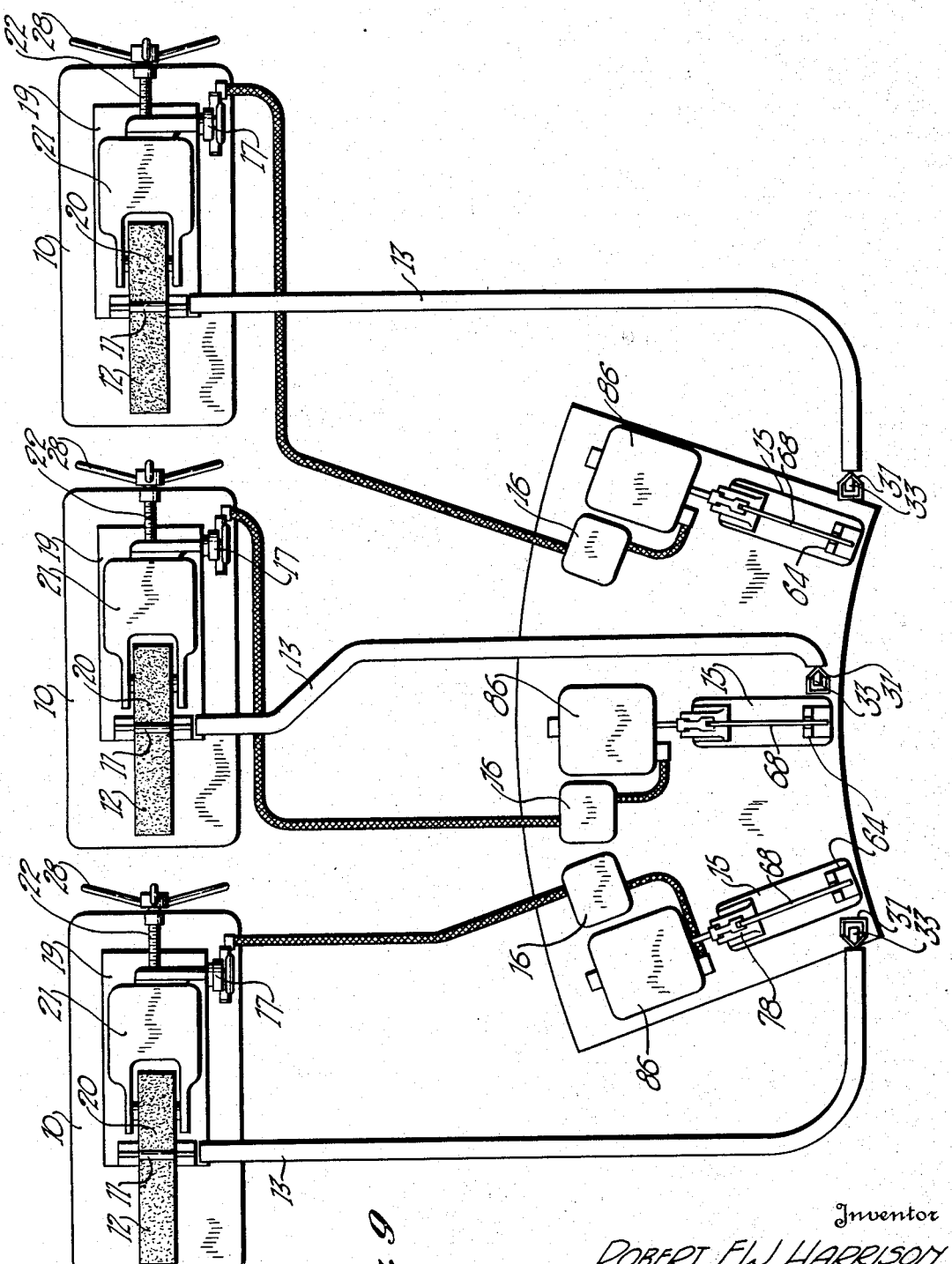

Patented May 26, 1936

2,042,257

UNITED STATES PATENT OFFICE 2,042,257

MACHINE TOOL

Robert E. W. Harrison and Cecil W. Hopkins, Cincinnati, Ohio, assignors to Cincinnati Grinders Incorporated, Cincinnati, Ohio, a corporation of Ohio Application June 30, 1931, Serial No. 547,936

12 Claims. (Cl. 51—165)

This invention relates to improvements in machine tools and especially to improvements in means for controlling and effecting the feeding of a tool and the work.

An object of the invention is the provision of improved means for feeding the tool and work relative to one another to compensate for wear of the tool as determined by the size of successive work pieces.

Another object of the invention is the provision of improved means disassociated and remote from a machine tool for controlling the relative feed between a work piece to be operated upon and the tool.

A further object of the invention is the provision of an improved amplifying gage mechanism for detecting oversize work pieces and for effecting an adjustment of the parts of a machine tool organization to correct for said error in the work.

A still further object of the invention is the provision of improved means for selecting predetermined work pieces to be gaged or inspected so that periodical adjustment of tool and work may be made to maintain the proper relation between them and insure successive work pieces being tooled to the desired size.

Other objects and advantages of the present invention should be readily apparent by reference to the following specification considered in conjunction with the accompanying drawings and it is to be understood that any modifications may be made in the exact structural details there shown and described, within the scope of the appended claims, without departing from or exceeding the spirit of the invention.

In the drawings:

Figure 1 is a top plan view of a machine tool and a gaging and feeding mechanism embodying the principles of this invention.

Figure 2 is a sectional view taken on line 2—2 of Figure 1 and showing in detail the timing mechanism forming a detail of the invention.

Figure 3 is a side elevational view of the gaging mechanism as seen from line 3—3 of Figure 1.

Figure 9 is a semi-diagrammatical view as seen from a plane above a battery of machine tools, each discharging finished work pieces to a common inspector who has control of the said battery of machines.

Throughout the several views of the drawings the same or similar reference characters are employed to denote the same or similar parts.

Figure 4:
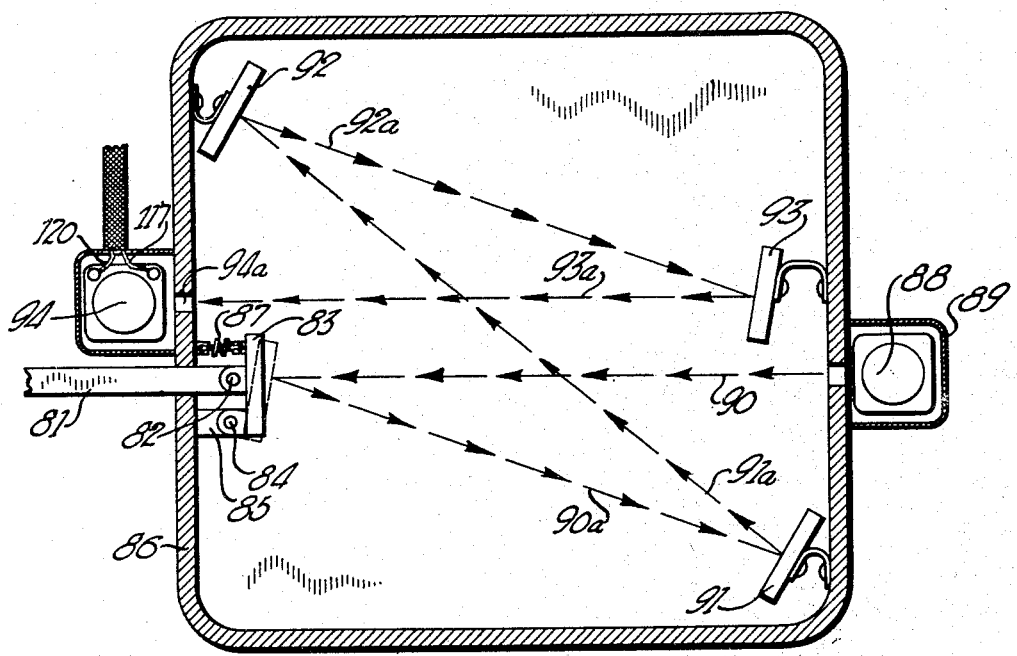
Figure 4 is a diagrammatic illustration of the light ray utilized when the work is beyond a certain definite size.

In the past, it has been customary to periodically manually gage or inspect the work by the machine operator to determine its size and the functioning of the machine. It has also been proposed to mount various electrical and mechanical sizing mechanisms directly on the machine tools in an attempt to compensate for variations in the size of the work. In the former method of manual inspection and size determination the operator frequently passed work not of the highest caliber or within predetermined definite sizes resulting in difficulty in the subsequent assembly or use of the parts. In the latter type of sizing structures mounted directly on the machine, chips removed from the work and in the case of grinding machines the grinding coolant and the human element entered to defeat the designed purpose thereof thereby resulting in work pieces that required further machining operations thereon or else complete rejection thereof. By the present invention all of these difficulties have been surmounted since the inspector and size controlling mechanism are situated remote from the machine having the work conveyed to him for periodical inspection and check up on the ultimate position of the several parts, all as will be made clearly evident in the following specification.

There has been chosen and depicted in the drawings for illustrative purposes the centerless grinder with which the inspection and controlling mechanism is employed but it is to be understood that this structure may be used with any other machine tool requiring a relative feed between the tool and work.

Generally the invention comprises a machine tool having a base or bed 10 supporting for operation thereon a work piece 11 and for presenting said work piece to a suitable tool or cutter, such as the grinding wheel 12. The work passes from the tool to a conveying mechanism, here shown as a trough 13, for conveyance to the inspection station which includes a bench or table 14. Mounted on the table 14 is the gaging mechanism 15 which, through suitable couplings and connections, operates an electrical circuit enclosed within the casing 16 which effects the operation of the feeding mechanism, as shown at 17, for feeding the work and tool relative to one another. From this it will be noted that the machine is at all times within the control of a skilled work inspector who can very minutely determine the size of the work piece and automatically make the necessary and proper adjustments of the machine tool parts which adjustments and the size of the work piece are in nowise affected by coolant chips or any other extraneous parts of the machine tool organization.

As was noted above, the machine illustrated in the drawings is a centerless grinder and the invention will now be described with reference specifically to that type of machine but the claims are not to be restricted in their scope except as specifically restricted.

Figure 8:
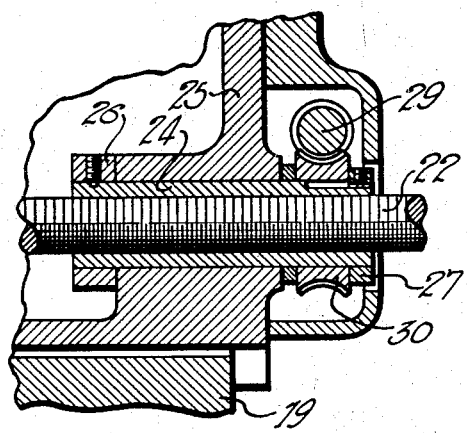
Figure 8 is a sectional view taken on line 8—8 of Figure 6.

A centerless grinder includes the bed or base 10 on which is rotatably mounted the grinding wheel 12 for operation on the work piece 11 supported on a work rest blade 18 mounted on the forward end of a slide 19 supported by the bed 10. Opposed to the grinding wheel 12 and engaging the work at a point substantially diametrically opposite to that engaged by the grinding wheel 12 is a regulating wheel 20 rotatably journaled in a bearing supported by a slide 21 superimposed upon the slide 19. The two wheels 12 and 20 are spaced from one another a distance representing the exact size of the work and the work 11 is then passed through this grinding throat to reduce it to the ultimate or desired size. As is well-known, considerable wear and frequent truings comparatively rapidly reduce the diameter of the grinding wheel thereby destroying the size of the grinding throat. To compensate for this wear the slides 19 and 20 are adapted to be advanced relative to the bed 10 toward the grinding wheel thereby to adjust the parts to the original set-up. For this purpose, see Figure 8, there is provided an adjusting screw 22 having one end journaled in a bearing 23 extending upwardly from the bed, see Figure 1. The adjusting screw 22 is threadedly received in a rotatable nut 24 journaled in the rear wall of the regulating wheel support 25. Collars 26 and 27 prevent endwise movement of the nut 24 but permit rotation thereof. Secured to the screw 22 exteriorly of the bracket 23 is a pilot or hand wheel 28 whereby the said screw may be adjusted for initially or manually adjusting the parts. The parts are automatically adjusted, as will later appear, through a worm 29 and a worm wheel 30, the latter being keyed to the nut 24 while the former is hydraulically actuated.

With the grinding throat conditioned as above described, the work 11 is passed therethrough into the conveyor or trough 13 for conveyance to the inspection station. As is well-known the wear on the grinding wheel resulting from its operation upon a comparatively small part is not sufficient to damage or change the throat size, therefore, only periodical inspection of the work takes place. To this end a suitable trip mechanism is provided at the end of the conveyor or trough 13 for selecting automatically the desired work pieces to be gaged. A pocket or chute 31 is provided at the end of the trough 13 into which the work pieces discharge from the said trough or conveyor 13 being intercepted by a baffle plate 32 and directed against a trigger 33. The trigger 33 is provided at the end of an actuator arm 34 pivoted intermediate its ends, as at 35, and having pivoted to its other end a pawl 36 which cooperates with a ratchet 37 fast on a shaft 38. A spring 39 yieldingly returns the actuator arm 34 to its initial position and a second spring 40 yieldingly maintains contact between the pawl 36 and the ratchet 37. A stop latch 41 prevents the rotation of the ratchet 37 except in one direction.

Secured to the shaft 38 on opposite sides of the ratchet 37 are a pair of cams 42 and 43. The cam 42 is substantially circular in cross section, being provided at one point in its periphery with a notch 44 to permit the end 45 of latch 46 to drop thereinto when in alignment. The latch 46 is pivoted at 47 and is actuated in a clockwise direction about this pivot by the spring 48 which movement is limited by engagement of the end 45 with the periphery of cam 42. The free end of the latch 46 has secured thereto a pivoted dog 49 engaging the rear face of the collar or shoulder 50 on one section 51 of a telescoping shaft. The shaft 51 is received in a socket 52 of the other section 52a of the telescoping shaft which is slidable through a suitable bearing 53 carried by the wall of the housing 54 enclosing the trip mechanism. The section 51 of the telescoping shaft is likewise slidable through a bearing carried by the wall of the housing 54. The shaft 52a has a collar or shoulder 56 against which abuts one end of a spring 57 which, in turn, abuts on its other end with the collar or shoulder 50 of the shaft 51. The shaft 52a extends beyond the bearing 53 into engagement with the periphery of the cam 43 which, it will be noted, has a very low point 58 from which its periphery effects a rapid rise 59 to the high point 60.

The rate of rotation of the shaft 38 and cams 42 and 43 will depend entirely on the number of teeth in the ratchet 37 wherefor a coarse tooth ratchet will rapidly advance the parts while a fine tooth ratchet will advance the parts at a substantially slower rate.

The operation of the trip mechanism is as follows: each work piece as it passes off the end of the trough 13 is deflected by the plate 32 into engagement with the trigger 33 oscillating the arm 34 about its pivot and advancing the shaft 38 through an arc equal to the distance between successive teeth. In other words, if it is desired to inspect and gage every fiftieth piece a ratchet having fifty teeth would be provided while if it were desired to inspect the work at closer or further intervals the proper ratchet would be employed. The parts would be initially positioned with the end of the portion 52 of the telescoping shaft engaging the lowermost point 58 of the cam 43 and the end or tail 45 of the latch 46 would engage the cam 42 at a point beyond the notch 44. Rotation of the shaft 38 would carry with it the cams whereby cam 43 would gradually shift the shaft portion 52a through its bearing 53 compressing the spring between itself and the shaft portion 51 which is held against movement by the dog 49 on the latch 46. This continues until the spring 57 is compressed substantially to its limit at which time the tail 45 of the latch 46 is aligned with the notch 44 whereupon spring 48 actuates said latch in a clockwise direction about the pivot 47 releasing the collar or shoulder 50 from the influence of the dog 49 permitting the spring 57 to expand and fire. This causes a forward shifting of the shaft portion 51 which carries at its forward end a roller 61 engaging a trap door 62 which is immediately below the chute 31 and actuates said door to the dotted line position shown in Figure 2 so that the next work piece descending through the chute 31 is shunted on to the top of the table 14. Otherwise the work pieces falling through the casing 31 pass through the passage 63c between the casing 54 and the table 14 to a suitable receptacle, not shown. The next work piece descending through the trough or conveyor 13 would engage the trigger 33 for advancing the ratchet 37 an additional tooth thereby advancing the high point 60 of the cam beyond the end of the telescoping shaft section 52. The weight of the door 62 would immediately shift the telescoping shaft sections 51 and 52 to the left, as seen in Figure 2, so that the end of the shaft 52 engages the low point 58 with the collar 50 behind the dog 49.

The inspector or operator then places the work piece on the gaging mechanism to determine its size. This mechanism comprises a base 63 to which the anvil or gage block 64 is secured. The block 64 is provided with an anvil 65a and a vertical wall or abutment 66 on which the work lies in contact with the gaging portion 67 of an arm 68 pivoted at 69 between lugs or the like 70 formed integral with or secured to the block 64. An adjusting screw 71 is provided in the arm 68 intermediate the pivot 69 and gaging portion 67 and contacts with an upper surface of the block 64 to hold the arm 68 in its normal position. It will be noted that the pivot 69 of the arm 68 is considerably closer to the gaging end 67 than to the free end of the arm whereby a large amplification is obtained at the free end of the arm 68. This free end of the arm 68 has a pin 72 secured therein received in an elongated slot 73 formed in the end of arm 74 of bell crank 75. The bell crank 75 in turn, is pivoted at 76 to a bracket 78 secured to the base 63 of the gaging mechanism 15. The other arm 79 of the bell crank 75 has a pin and slot connection as at 80 with a link 81 having at its opposite end a pivotal connection 82 with a mirror 83 pivoted at 84 to a bracket 85 formed interiorly of light beam casing 86. A spring 87 is mounted between the mirror 83 and casing 86 tending to return and hold the parts in their normal position and maintain contact between the end of the adjusting screw 71 and gage block 64.

The relation between the under or contacting face of the gage portion 67 of the arm 68 and the inclined surface 65 of the anvil block 65a and the vertical wall or abutment 66 represents the exact size of the work, this relation being maintained by the adjustable stop screw 71. Therefore, it will be noted should a work piece be oversize it will oscillate the arm 68 about its pivot 69 and thereby actuate the bell crank 75 and mirror 83. This oscillation of the mirror 83 causes a swinging of a light beam directed from a suitable source onto the said mirror 83.

In order that the gaging mechanism may be adjusted to various diameters the block 64 is provided in its forward face with a guide rib 64a received in a corresponding guideway formed in the anvil 65a. The anvil 65a has formed at its upper end the inclined surface 65 on which the work rests. An ear or lug 63a extends from the base 63 and has journaled therein the adjusting screw 63b which has a threaded connection with the anvil 65a and whereby the said anvil is raised or lowered relative to the block 64.

The light beam amplification mechanism, as shown in Figure 4, includes a source of light 88 within the casing 89 located at one side of the housing 86 which directs a beam of light to the mirror 83. This beam of light with the mirror in the solid line position in Figure 4 is reflected back to the source of light, as indicated by the arrowed line 90, while a shifting of the said mirror, due to the oversize of the work piece, will cause said beam of light to move through an arc to the position indicated in Figure 4 by the arrowed line 90a. As there shown the beam 90 upon striking the mirror 83 is deflected in the path indicated as 90a to a second mirror 91 from which the beam extends as 91a to a third mirror 92 from which the beam 92a travels to a fourth mirror 93 through the path 93a to a light sensitive cell 94, known commercially as a photoelectric cell. This cell 94 is in the nature of a tube and acts as a switch for completing an electrical circuit to effect an additional movement between the tool and work to produce successive work pieces to the desired size, as will later appear.

Figure 5:
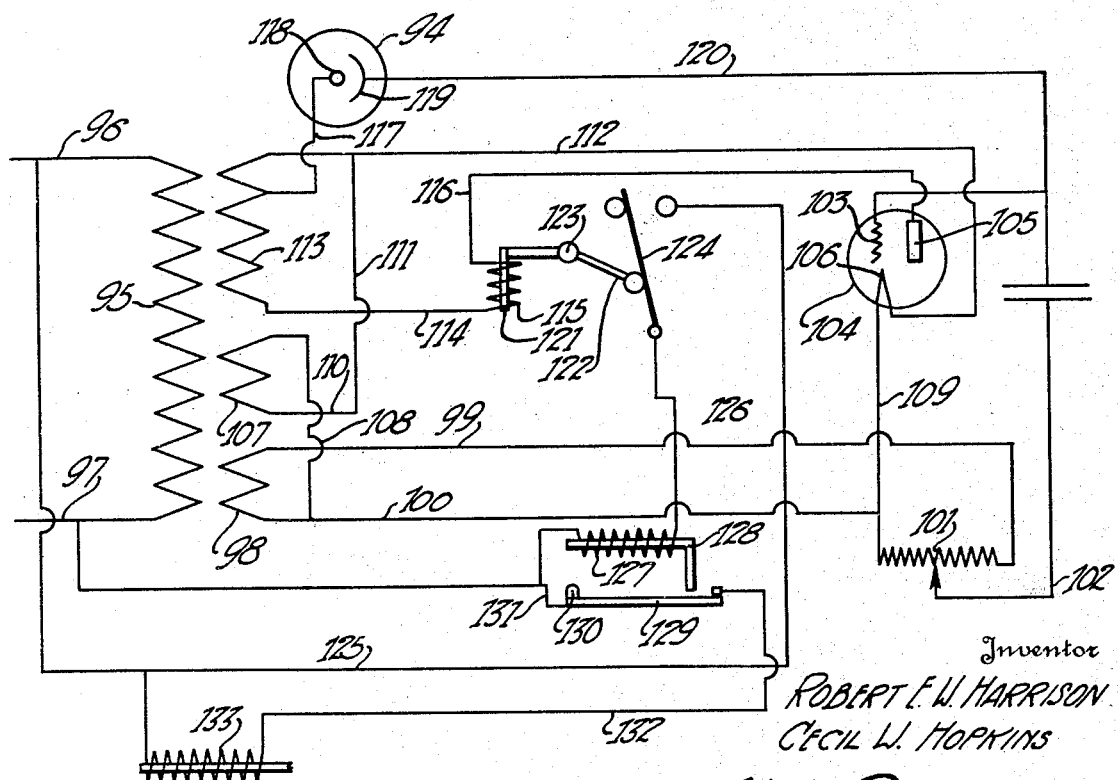
Figure 5 is a wiring diagram of the electrical circuit operated by the light ray shown in Figure 4.
Figure 6:
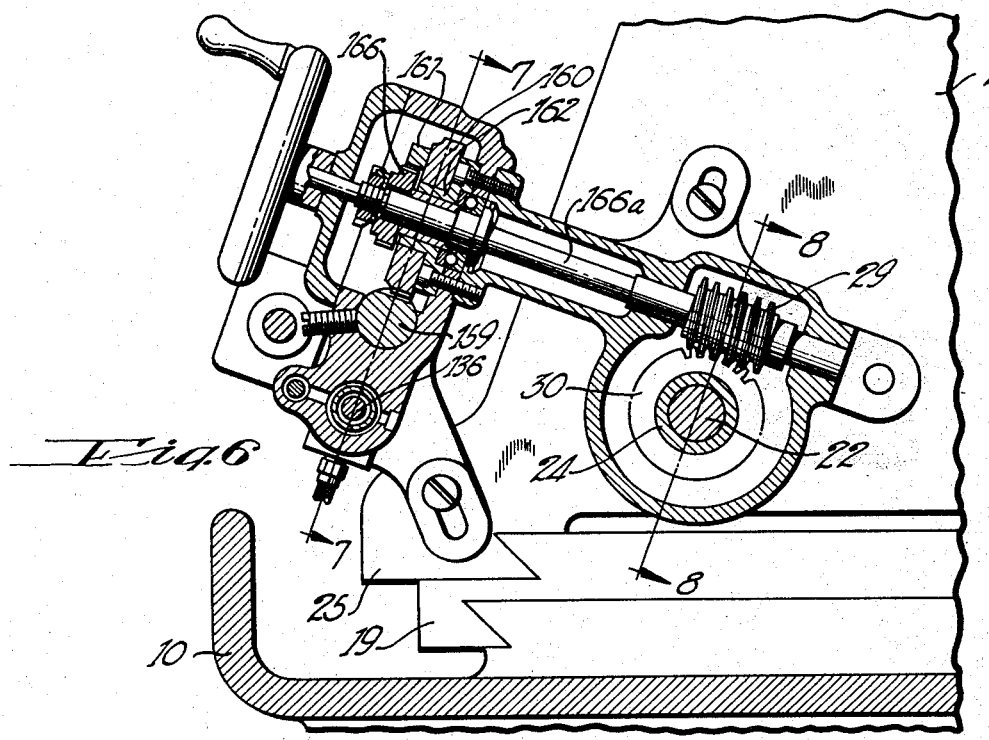
Figure 6 is a sectional view taken on line 6—6 of Figure 1.
Figure 10:
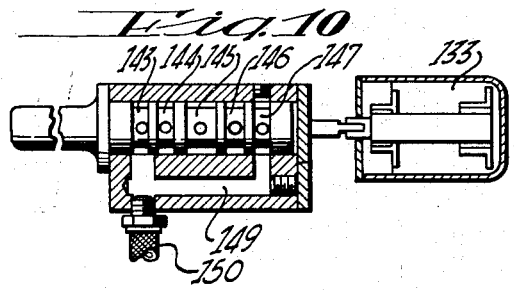
Figure 10 is a sectional view taken on line 10—10 of Figure 7.

The photoelectric cell 94 is shown diagrammatically in Figure 5 which diagrammatically illustrates the electrical circuit controlled and operated thereby. This circuit includes a suitable transformer 95 coupled with a source of current or main power lines 96 and 97 for feeding current of the desired voltage to the several electrical instrumentalities there employed. The coil 98 has feed lines 99 and 100 extending therefrom and terminates in a potentiometer 101 which, through line 102 extending from the potentiometer places a negative potential on the grid 103 of the radio or vacuum tube 104. The vacuum tube 104 includes a plate 105 and a filament 106, the latter receiving current from the coil 107 through lines 108, 109 and 109 to one side of the filament and through lines 110, 111 and 112 to the other side thereof. The plate 105 receives current from the coil 113 through a line 114, solenoid 115 and line 116, the current tending to return through the filament and line 112 to the upper side of the coil but being blocked by the negative electrical potential on the grid 103. The intermediate portion of the coil 113 is connected by a line 117 to one element 118 of the photoelectric cell 94 while the second element 119 thereof is connected by a line 120 to the potentiometer grid line 102. The solenoid 115 has extending therethrough a core 121 secured to bell crank 122 pivoted at 123 for operating switch blade 124. This switch blade 124 is employed for completing an electrical circuit including the conductor 125 from the main line 96 through a conductor 126 to the second main line 97. This conductor 126 has included thereon the solenoid 127. A core 128 associated with the solenoid 127 is employed for operating switch blade 129 about its pivot 130 to complete a second shunt circuit extending from the line 126 through conduit 131 and a second conduit 132 extending from conduit 125.

The operation of this part of the mechanism is as follows. With the gage bar 68 in its normal position the light from its source 88 is directed back upon itself. Also, the electrical potentiometer on the grid 103 of the vacuum tube 104 will prevent a flow of current therethrough since the photo-electric cell will only complete the circuit when a beam of light is directed thereon. As the work piece is mounted on the gage block 70 the arm 68 is oscillated in a counter clockwise direction thereby shifting the mirror 83 to the dotted line position shown in Figure 4 whereupon the beam of light through the several mirrors there shown will terminate on the cell 94 completing the electrical circuit between the elements 118 and 119 causing a flow of current through the lines 117 and 118 for placing a positive charge of current on the grid 103 thereby nullifying the blocking action of the negative potential whereupon a flow of current is established between the plate 105 and the filament 106 causing a flow of current through the lines 114 and 116 and the solenoid 115. This energization of the solenoid 115 operates the bell crank 122 about its pivot 123 thereby operating switch blade 124 and completing the electrical shunt circuit 125 and 126 which energizes the solenoid 127 in the line 128. The energization of the solenoid 127 effects the operation of the switch blade 129 for completing the second shunt circuit through lines 131 and 132 to energize the solenoid 133 in said circuit.

The proportion of the parts is such that a tenth of a thousandth of an inch on the work 11 will, through the large amplification in the arm 68, effect a relatively wide deflection of the mirror 83 and a wide sweep of the beam of light at the outer end thereof to bring the end of said beam of light into registry with the opening 94a to the light sensitive cell 94. However, it will be necessary that the beam of light be directed onto the cell 94 and therefore, if the work piece is less than the tolerance allowed, here considered as a tenth of an inch, the in feed or adjustment of the tool and work will not be effected. On the other hand, if the size of the work piece is more than the tolerance, the passing of the light beam across the opening 94a will be sufficient to compensate for the difference in the size of the work and will operate the automatic in-feed mechanism.

The solenoid 133 has a core 134 coupled with a valve stem 135. The valve proper 136 on the stem has a plurality of grooves indicated respectively at 137, 138 and 139 and provided with suitable intermediate cylindrical portions having a sliding fit in the valve bushing 140 mounted in the casing 141 carried by the bracket 142. This bushing has the ports 143, 144, 145, 146 and 147 for coupling a hydraulic medium under pressure with opposite ends of the in-feed mechanism. Port 145 is aligned with inlet 148 for the oil or hydraulic actuating medium under pressure while ports 143 and 147 are coupled with passage 149 from which extends the exhaust or discharge conduit 150.

Figure 7:
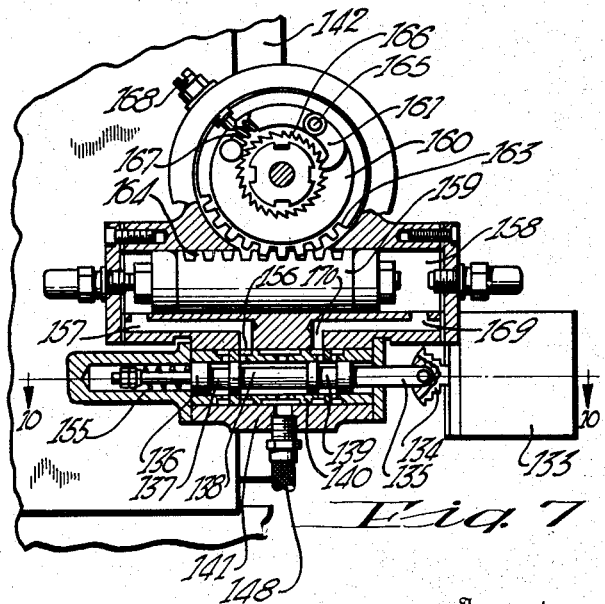
Figure 7 is a sectional view taken on line 7—7 of Figure 6.

When the solenoid is de-energized spring 155 shifts the valve to the position shown in Figure 7. The flow of the actuating medium is then from the supply pipe 148 through the port 145, groove 138, port 156 and passage 157 to the left hand end of cylinder 158 urging the piston 159 therein to the right and oscillating a disc 160 and pawl 161 carried thereby to an inoperative or retracted position. The disc 160 is rotatably supported by a bushing 162 and has a segmental or circumferential rack portion 163 adapted to mesh with a rack 164 on the piston 159. The pawl 161 is pivoted as at 165 intermediate its ends to the disc 160 having one end adapted for engagement with the teeth of a ratchet 166 as the disc and pawl are moved in a clockwise direction and having the opposite end pressed downward in such engaging relation by a spring 167. The ratchet 166 is keyed to a shaft 166a integral with or having secured thereto the worm 29 whereby said worm and parts connected therewith are operated. This end is additionally beveled for engagement with an adjustable kick out screw 168 carried by the bracket 142.

When the cylinder 158 is actuated to the right, as above described, and as seen in Figure 7, the liquid contained in the right hand end of the cylinder is exhausted through a passage 169, port 170, groove 139 and port 147 and the passage 149 to the discharge conduit 150.

When the electric control circuit is completed the solenoid is energized and reversely shifts the valve member. In this event the inlet of fluid is from conduit 148, ports 145 and 146, passages 170 and 169 to the right hand end of the cylinder shifting the piston over on its feeding stroke which is shown as just completed in Figure 8. In this instance the exhaust is through passages 157 and 156, ports 144 and 143 to the passage 149 and exhaust conduit 150.

Return of the mirror 83 to its normal position shifts the beam of light of the photoelectric cell thereby breaking the electrical circuit therethrough allowing a negative potential to be placed on the grid 103 and interrupting the flow through the circuit containing the solenoid 115 whereupon the switch arm 124 interrupts the shunt circuit and de-energizes the solenoid 133 at which time the spring 155 shifts the valve, as above described, for re-setting the parts for a subsequent feeding movement.

From the foregoing description the construction and operation of the present improved mechanism for preventing the production of oversize work pieces should be readily understood and it will be noted that the work may be automatically passed in a continuous stream through the grinding throat. As so passed work pieces in excess of the predetermined size will effect a shifting of the mirror 83 and complete the electrical circuit through the photoelectric cell 94 and effect a compensation between the work and tool.

Figure 9 illustrates the application of the invention to a multiplicity or battery of machine tools, each delivering the work pieces to a common station whereby a single inspector or operator may control the battery of machines at a point remote therefrom and insure the proper size and finish on the work.

It will further be noted that the size determining mechanism in question is readily utilizable for imparting feeding movement to any machine in which the completed work pieces after discharged from the machine may be caused to pass successively in engagement with the work contacting feeler and will serve to effect proper adjustment of the work support and tool one relative to the other irrespective of whether the adjustment be of the tool or of the work support and that in either event accurate size maintenance and prevention of production of oversize work pieces due to the wear of the grinding wheel or other cutting tool is most satisfactorily effected.

What is claimed is:

1. In a machine tool organization the combination of a machine tool including a support for a work piece, a tool for operation on the work piece, means for effecting relative feeding movement between the work and tool, means disassociated from the machine tool for operating the feeding means including an amplifying gage, and means conveying the work from the machine tool to the gage.

2. In a machine tool organization the combination of a work support, a tool, means for effecting a relative feeding movement between the work and tool, and light operated means operable by an oversized work piece for energizing the feeding means.

3. In a machine tool organization the combination of a work support, a tool, means for effecting a relative feeding movement between the work support and tool, means operable by an oversized work piece for operating the feeding means including an amplifying lever, a mirror operatively connected with the lever, a light source, and means intercepting the light source and operatively connected with the feeding means.

4. A gaging and feeding mechanism for use in a machine tool organization for effecting a relative feed between the work and a tool comprising an hydraulic pressure source for the feeding mechanism, a valve controlling the pressure source, electro-magnetic means for shifting the valve, an amplifying gage arm for contact with the work, and an electric circuit including a light sensitive member completable by an oversized work piece in cooperation with the amplifying gage arm.

5. In a feeding mechanism operated by an oversized work piece the combination with a work support, a tool, and means effecting a relative feed between the work and tool, of electromagnetic means for operating the feeding mechanism, an electric circuit therefor, a light source, and a light sensitive cell in the electrical circuit for completing same upon direction of the light source thereto by an oversized work piece.

6. A control mechanism for controlling the feeding movement between a work piece and a tool comprising means for effecting said feeding movement including a hydraulic pressure source, a valve for controlling the pressure source, electromagnetic means for operating the valve, an electrical circuit for the electromagnetic means, means preventing a flow of current through the circuit, and means operated by an oversized work piece for nullifying the blocking means and effecting an operation of the feeding mechanism.

7. A control mechanism for controlling the feeding movement between a work piece and a tool comprising means for effecting said feeding movement including a hydraulic pressure source, a valve for controlling the pressure source, electromagnetic means for operating the valve, an electrical circuit for the electromagnetic means, means preventing a flow of current through the circuit, means operated by an oversized work piece for nullifying the blocking means and effecting an operation of the feeding mechanism, said means including a light sensitive cell, a light source, and means operated by the oversized work piece for directing the light source onto the light sensitive cell.

8. In a control device for a feeding mechanism the combination of an amplifying gage, a light source, light operated means, feeding mechanism controlled by the light operated means, an electrical circuit for the feeding mechanism including the light operated means and means between the light source and light operated means adjustable by the work through the amplifying gage for closing the electrical circuit and operating the feeding means.

9. In a feed control mechanism the combination of an amplifying gage, a feeding mechanism, an electrical circuit for the feeding mechanism, light sensitive means in the circuit for completing same, a series of mirrors including an adjustable mirror operable by the amplifying gage for directing the light source to the light sensitive means and completing the electrical circuit.

10. In a device of the class described the combination of a feeding mechanism, an electrical circuit for operating the feeding mechanism, a shunt electrical circuit for controlling the main circuit and including a switch therein, a solenoid for operating the switch, an electrical valve in the circuit for normally preventing a flow through the circuit by placing a negative electrical potential thereon, a light sensitive means in the circuit for nullifying the electrical potential on the valve, and means for directing a beam of light on the light sensitive means.

11. In a device of the class described the combination of a feeding mechanism, an electrical circuit for operating the feeding mechanism, a shunt electrical circuit for controlling the main circuit and including a switch therein, a solenoid for operating the switch, an electrical valve in the circuit for normally preventing a flow through the electrical circuit by placing a negative electrical potential thereon, a light sensitive means in the circuit for nullifying the electrical potential on the valve, means for directing a beam of light on the light sensitive means, said means including an amplifying gage, and adjustable mirror operable thereby, a light source, and a series of mirrors between the adjustable mirror and light sensitive means.

12. In a gaging and feeding control mechanism the combination of a frame, a mechanical arm pivoted on the frame having a relatively large amplification on opposite sides of the pivot, an adjustable anvil cooperating with the short end of the arm and spaced therefrom a distance equal to the proper size of the work, a feeding mechanism, an electrical circuit for the mechanism, light sensitive means for completing the electrical circuit and operating the feeding means, and means on the other end of the amplifying arm operable by an oversize work piece on the anvil for controlling the light means.

ROBERT E. W. HARRISON.
CECIL W. HOPKINS.